Aug. 13, 1968
T. A. ROGERS
3,396,804
VIBRATORY PLOW
Filed April 2, 1965
3 Sheets-Sheet 2
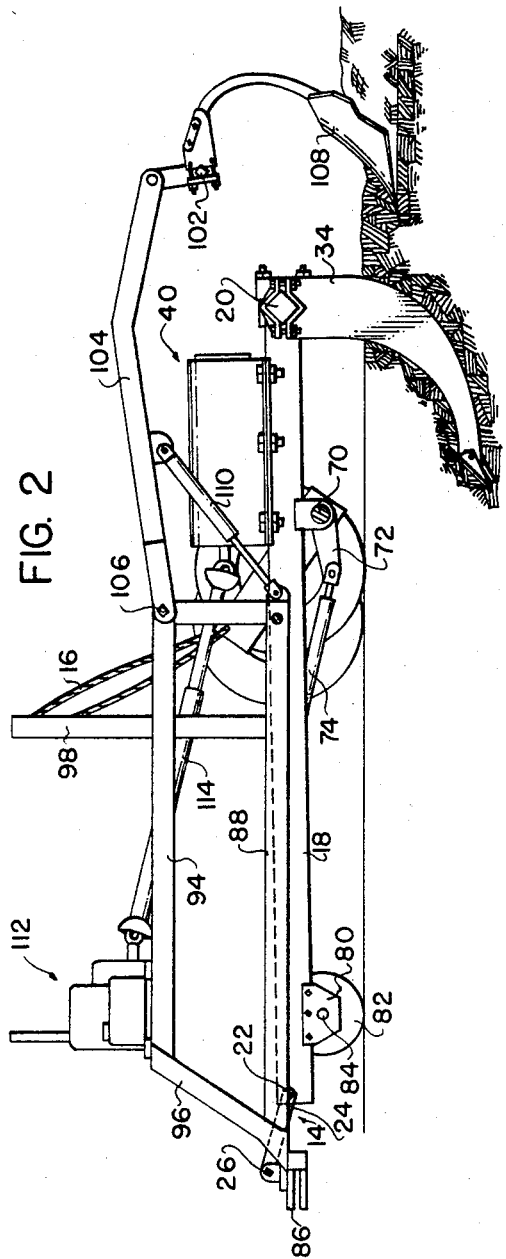
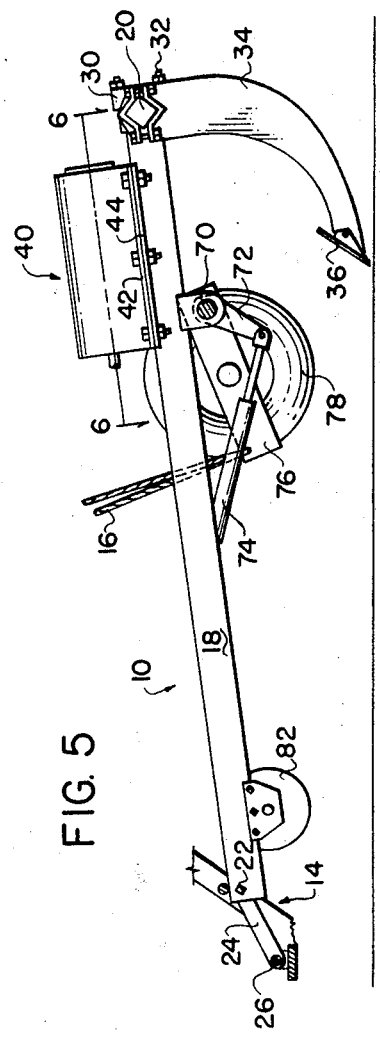
THELMER A. ROGERS
INVENTOR.
BY Aug. 13, 1968  T. A. ROGERS  3,396,804
VIBRATORY PLOW Filed April 2, 1965  3 Sheets-Sheet 3

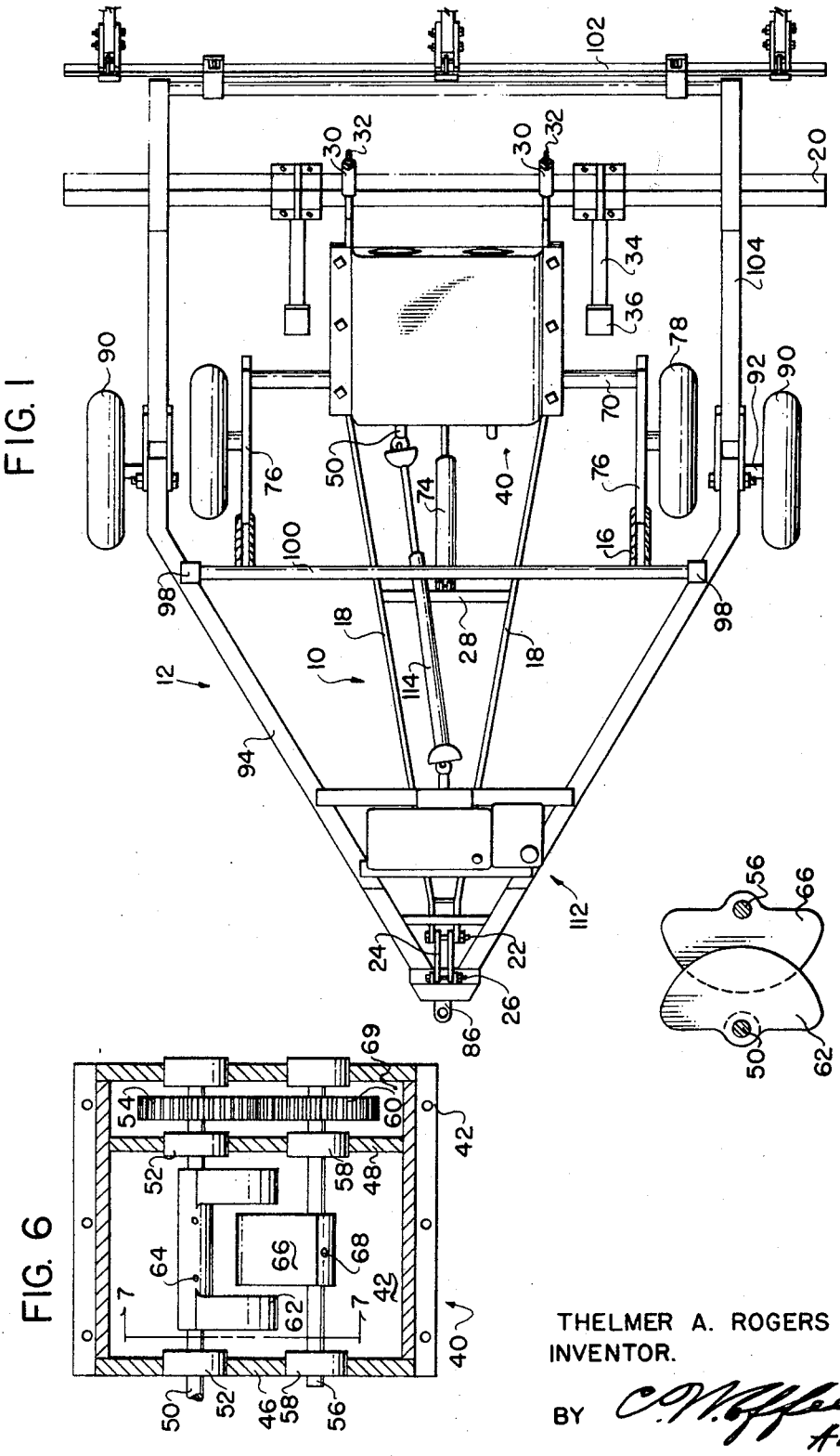

THELMER A. ROGERS
INVENTOR.

BY *C. O. McAfee*
Atty.

United States Patent Office 3,396,804
Patented Aug. 13, 1968

3,396,804
VIBRATORY PLOW
Thelmer A. Rogers, P.O. Drawer 1589,
Lubbock, Tex. 79408
Filed Apr. 2, 1965, Ser. No. 445,156
13 Claims. (Cl. 172—40)

ABSTRACT OF THE DISCLOSURE

A plow frame vibrated by a pair of rotating eccentric weights has a ground engaging wheel next to the hitch to prevent transmission of vibration into the hitch. An outer frame surrounds the vibrated frame for isolation of vibration, for lifting the vibrated frame, and for carrying auxiliary equipment.

---

This invention relates to vibratory plows and more particularly to a vibrating subsoiler or chisel type plow.

Vibratory plows have been developed and recognized as useful. The development has been hampered by the fact that for optimum operation in agriculture large amplitude vibration of medium frequency is desired; i.e. the tillage implement moves a total of about three inches each cycle at about 300 to 500 cycles per minute. To attain this mode of vibration it has been found most desirable to vibrate the entire frame of the plow. This introduces difficulties inasmuch as the vibration tends to destroy equipment.

Also different vibratory motions are desired in different soils and soil conditions. Tighter, gummier soils require different vibration than looser, sandier soils. Dry soil responds differently than does the same soil when moist. Sometimes it is more desirable to have rectilinear horizontal vibration, sometimes rectilinear vertical vibration and sometimes a circular vibration is desired.

An object of this invention is to provide a vibratory plow.

Another object is to provide a vibratory plow which isolates the vibration from associated equipment.

A further object is to provide a vibratory plow with an outer frame which has little or no vibration so that auxiliary equipment may be mounted upon the outer frame that has little or no vibration.

A further object is to provide a combined depth gage and elevating mechanism.

A still further object is to provide a vibratory plow with a vibratory means which is readily adjustable to produce different modes of vibratory motion.

Another object is to provide a vibratory plow with a ground engaging wheel adjacent to the hitch to dampen out most of the vibration which would otherwise be transmitted into the hitch and the towing vehicle.

A still further object is to provide a combination plow which with a vibrating chisel cultivates the soil at a deep depth and with a nonvibrating lister furrows the ground at the surface.

Still further objects are to achieve the above with a device that is sturdy, compact, durable, simple, versatile, and reliable, yet inexpensive and easy to manufacture and operate.

The specific nature of the invention as well as other objects, uses, and advantages thereof will clearly appear from the following description and from the accompanying drawing, the different views of which are not to the same scale, in which:

FIG. 1 is a plan view (partially broken away) of a vibratory plow according to this invention.

FIG. 2 is a side elevational view showing the plow in a plowing position, with two wheels not shown.

FIG. 5 is a sectional view of the inner vibratory frame only in the raised position.

FIG. 6 is a sectional view of the vibratory means taken on line 6—6 of FIG. 5.

FIG. 7 is a sectional view of the vibratory means taken on line 7—7 of FIG. 6.

Figure 4:
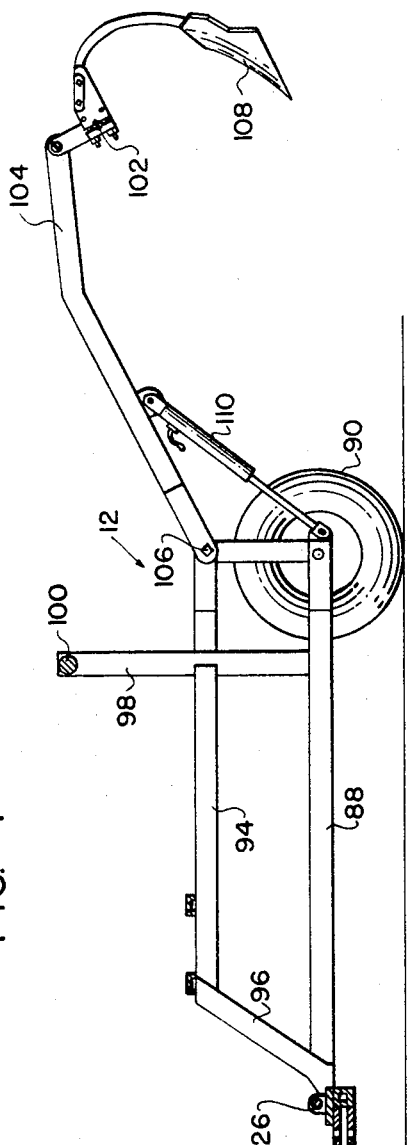
FIG. 4 is a sectional view of the outer frame only with the plow in the raised position.
Figure 3:
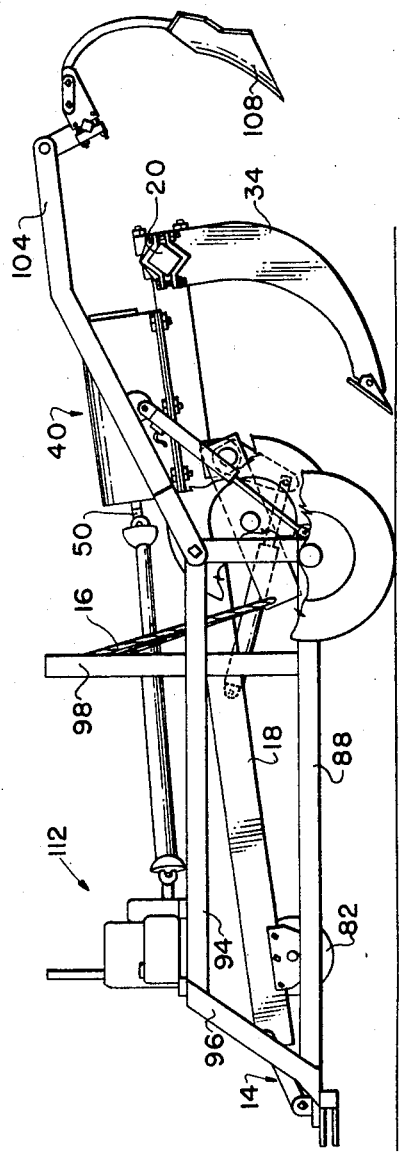
FIG. 3 is an elevational view showing the plow in the raised position for transportation, with the wheels partially broken away.

Referring more particularly to the drawings it may be seen that there are provided two frames, an inner vibratory frame 10 and an outer frame 12. The vibratory frame 10 is towed by the outer frame 12 through hitch means 14 on the front of the vibratory frame. When the plow is operating as seen in FIG. 2 this is the only connection under strain between the vibratory frame and the outer frame. In the transport position as seen in FIG. 3 the elements are in such position that the inner frame and outer frame are also connected by taut cables 16.

The vibratory frame 10 includes two plate members 18 which extend from the hitch means 14 at the forward end of the vibratory frame to vibratory tool bar 20 at the rear of the vibratory frame. The vibratory frame is elongated in the direction of draft and the plates 18 are quite elongated and relatively close together. The hitch means 14 includes a horizontal pin 22 extending from one of the side plates 18 to the other. Two straps 24 are pivoted about one end at the horizontal pin 22 and at the other end through pin 26 which extends horizontally between two ears on the outer frame 12. The holes in each end of the straps 24 have ample clearance around the pins 22 and 26. Therefore the hitch means 14 is not a rigid connection but one which provides for ample movement particularly in the vertical direction.

The frame plates 18 are connected by numerous cross braces 28 as are necessary to provide a rigid frame.

The frame 10 also includes the vibratory tool bar 20 which is attached to the rear of the plates 18 by caps 30 and bolts 32. This connection is a conventional and not discussed further here. A plurality of plow shanks 34 (two illustrated) are attached to the tool bar by conventional means. The plow shanks have earth working implements 36 in the form of shoes on the bottom thereof. The tool bar 20 is horizontal and at right angles to the direction of draft. The plow shanks 34 extend a considerable depth within the ground.

Vibratory means 40 includes base plate 42 bolted to flanges 44 which are welded or otherwise attached to the frame plates 18 near the vibratory tool bar 20. Front plate 46 is attached to the front of the base plate 42 and back plate 48 is attached near the rear thereof. Drive shaft 50 extends through bearings 52 in the front and rear plate. Spur gear 54 is attached to the rear of the drive shaft 50. Jack shaft 56 is mounted in bearings 58 in front and back plate. Spur gear 60 on the back of shaft 56 is the same diameter as gear 54 and meshed therewith.

U-shaped eccentric weight 62 is attached by pin 64 to the drive shaft 50. Unitary eccentric weight 66 is attached by pin 68 to the jack shaft 56. As illustrated in FIG. 6 the eccentricity of each of the weights are toward one another at the same time. In such arrangement a rectilinear vertical vibratory motion will be produced. If a rectilinear horizontal vibratory motion is desired it may be obtained by removing the pin 68 and rotating the weight 66, 180° and replacing the pin 68. Analysis will show such an arrangement will produce a rectilinear horizontal vibratory motion. A rotary vibratory motion is easily achieved by removing one or the other of the eccentric weights 62 or 66 or perhaps more easily by removing one of the spur gears 54 or 60. The spur gears 54 and 60 are encased in a container 69 containing lubricating material. The different vibratory motions are normal to the direction of draft which is parallel to the drive shaft 50.

Horizontal axle 70 is pivoted in suitable bearings beneath the frame plates 18 at right angles to the direction of draft. Therefore axle 70 is parallel to vibratory tool bar 20. Leg 72 is connected to the axle at approximately the center thereof. Hydraulic motor 74 is attached and pivoted at one end to a cross brace 28 of the frame and the other end to the end of the leg 72. Activation of the motor 74 will rotate the axle 70. Crank arms 76 are attached one at each end of the axle 70. Pneumatic tire 78 is mounted on each of the crank arms intermediate the ends. The cable 16 is attached to the end of each of the crank arms. It is desirable for the vibratory frame 10 to be mounted resiliently. The pneumatic tires 78 act as gages to gage the depth that the plow shanks 34 enter the ground and they also act as a resilient supporting means for the vibratory frame.

Bracket 80 is attached to the forward end of the frame plate 18 adjacent the hitch means 14. Ground engaging wheel 82 is mounted by axle 84 for rotation to the bracket and thus the frame. Difficulty has been experienced with vibrations being transmitted through the hitch. This ground engaging wheel 82 at this point tends to prevent the front of the vibratory frame 10 from movement and dampens out the vibration at that point. Therefore very little if any vibratory motion is transmitted through the hitch means 14. The ground engaging wheel 82 is made of metal. It is necessary that the vibrating means 40 be quite close to the plow shanks 34 and that the ground engaging wheel 82 be quite close to the hitch 14. For example if the ground engaging wheel 82 were about halfway between the hitch 14 and the means for vibrating 40, then the frame 10 would tend to oscillate about the ground engaging wheel 82 and there would be considerable vibration at the hitch 14 which would be transmitted into the towing vehicle.

The towing vehicle for the vibratory frame 10 is the outer frame 12. The outer frame 12 itself has a hitch composed of two horizontal plates 86 at its forward end. The outer frame includes two side members 88 which angle rearwardly and outwardly so that it extends in front of the vibratory frame 10 and to either side of the vibratory frame. Outer wheels 90 are journalled upon spindles 92 onto the outside of the side members 88. Thus the outer frame 12 is supported by wheels above the ground. The outer frame also includes upper structural members 94 which are connected to the lower structural members 88 by support members 96. Two additional support members 98 extend above the upper structural members 94 and support cross bar 100 between them. Cross bar 100 is horizontal and normal to the direction of draft and therefore parallel to tool bar 20. The cable 16 connects to cross bar 100. Therefore when the axle 70 is rotated by motor 74 so that the tires 78 are pushed downward lifting the vibratory frame 10 to a certain limit the cables 16 will tighten and continued movement by the motor 74 will lift the vibratory frame clear of the ground.

The center of gravity of the vibratory frame 10 is to the rear of the connections of the cables 16 to the crank arms 76. Therefore as the cable 16 lifts the vibratory frame, the front or hitch end of the vibratory frame is lifted first, lifting the ground engaging wheel 82 from the ground before the plow shanks 34 are lifted from the ground. When the vibratory frame 10 is in the lifted or transport position, the front wheel 82 is lifted off the ground. Therefore it may be seen that a simple mechanism is used to both lift the vibratory frame 10 to remove the plow shanks 34 from the ground and also to adjust the depths of the plow shank 34 in the ground when being used. When the plow is in any plowing position the cables 16 are slack and the vibratory frame is supported by a resilient means (tires 78). For transport the entire inner frame together with the tires and the plow shanks are lifted free of the ground.

Often it is desirable to list the land simultaneous with deep vibratory cultivation. Often it is undesirable or not necessary to vibrate the listers. Lister tool bar 102 is attached to arms 104 which are pivoted by pins 106 to the rear of the upper structural members 94. Therefore conventional listers 108 may be attached by conventional means to the lister tool bar 102. The depth of the listers and the raising of them is governed by hydraulic motor 110 which innerconnects the rear of the side members 88 and the arms 104 as illustrated.

Internal combustion engine 112 is mounted on the forward portion of the upper structural members 94. The engine 112 connects to the drive shaft 50 through the extension shaft 114 which is connected at either end by universal joints. The outer frame 12 with its upper structural members 94 provides a suitable non-vibrating frame to mount auxiliary equipment. Two pieces of auxiliary equipment has been illustrated mounted thereon namely engine 112 and lister tool bar 102. It will be apparent to those with skill in the art that other auxiliary equipment could be mounted thereon, such as tanks for fertilizer in case a fertilization operation was being conducted. The engine 112 is considered a piece of auxiliary equipment inasmuch as the vibratory means 40 is readily drivable from the power takeoff connection of the towing vehicle (not shown).

Although the lister tool bar 102 is illustrated as being raised by a separate hydraulic motor 110 it will be apparent that if the operator fails to actuate the motor 110 before actuation of the motor 74 that as the frame 10 raises the vibratory tool bar 20 will contact the arms 104 and raise the lister tool bar 102 by such action. The motor 110, acting only in one direction, will permit this movement.

It will be apparent that the embodiment shown is only exemplary and that various modifications can be made in construction, materials, and arrangement within the scope of the invention as defined in the appended claims.

I claim:
1. In a vibratory plow having:
   (a) a frame elongated in the direction of draft,
   (b) hitch means on the front of the frame for pulling it,
   (c) at least one plow shank attached to the rear of the frame,
   (d) an earth working implement attached to the bottom of the plow shank,
   (e) vibratory means on the frame near the plow shank for vibrating the frame in a direction normal to the direction of draft and thus vibrating the plow shank and earth working implement, and
   (f) means on the frame near the plow shank for resiliently supporting the plow shank in adjustable distance vertically with respect to the ground,
the improvement in combination with the above comprising:
   (g) a ground engaging wheel mounted on the frame near said hitch means, so arranged and constructed to prevent vibration being transmitted through said hitch means to a draft vehicle.
   (h) an outer frame extending in front of and on either side of said vibratory frame,
   (j) outer frame hitch means on the forward portion of the outer frame for pulling it,
   (k) said hitch means on the front of the vibratory frame attached to said outer frame immediately to the rear of the outer frame hitch means,
   (m) ground engaging wheels on the outer frame near the rear thereof, and
   (n) An elevating means interconnecting the outer frame and vibratory frame for elevating the earth working implement above the ground.

2. The invention as defined in claim 1 with the addition of:
(o) a power means mounted on said outer frame and transmission means for transmitting power from said power means to said vibratory means on said vibratory frame.

3. The invention as defined in claim 1 wherein:
(o) said hitch means on the vibratory frame is not rigid, and
(p) said elevating means attached forward of the center of gravity of the vibratory frame so that as the vibratory frame is being elevated, the ground engaging wheel is lifted first to the limit of the hitch means and the rear of the frame carrying the plow shanks is lifted thereafter.

4. The invention as defined in claim 1 with the addition of:
(o) a lister tool bar,
(p) means for connecting said lister tool bar to said outer frame for vertical adjustment of said lister tool bar, and
(q) a plurality of listers mounted on said lister tool bar.

5. The invention as defined in claim 2 wherein the means for connecting said lister tool bar includes:
(r) a hydraulic cylinder.

6. The invention as defined in claim 2 wherein the lister tool bar is attached to the outer frame by arms which extend over the vibratory tool bar.

7. In a vibratory plow having:
(a) a vibratory frame,
(b) at least one plow shank mounted on said vibratory frame,
(c) an earth working implement attached to the bottom of the plow shank,
(d) vibratory means on the vibratory frame for vibrating it, and
(e) gage means on the vibratory frame for resiliently supporting the plow shanks an adjustable distance in the ground,
the improvement in combination with the above comprising:
(f) an outer frame extending in front of and on both sides of the vibratory frame,
(g) ground engaging wheels on the outer frame,
(h) hitch means for hitching the vibratory frame at the front to the outer frame, and
(j) auxiliary equipment mounted on the outer frame.

8. The invention as defined in claim 7 wherein said means for resiliently supporting is in the form of pneumatic tires.

9. The invention as defined in claim 7 wherein:
(k) said gage means includes wheels (m) attached to the vibratory frame by crank arms connected to
(n) a crank axles journalled to the vibratory frame, and
(o) cables extending from the crank arms to said outer frame.

10. The invention as defined in claim 7 wherein said auxiliary equipment is:
(k) a tool bar.

11. The invention as defined in claim 7 wherein said auxiliary equipment is:
(k) power means for powering the vibratory means.

12. In a vibratory plow having:
(a) a vibratory frame,
(b) at least one plow shank mounted on said vibratory frame,
(c) an earth working implement attached to the bottom of the plow shank,
(d) vibratory means on the vibratory frame for vibrating it, and
(e) gage means on the vibratory frame for resiliently supporting the plow shanks an adjustable distance in the ground,
the improvement in combination with the above comprising:
(f) an outer frame extending in front of and on both sides of the vibratory frame,
(g) outer frame hitch means on the forward portion of the outer frame for pulling it,
(h) said hitch means on the front of the vibratory frame attached to said outer frame immediately to the rear of the outer frame hitch means,
(j) ground engaging wheels on the outer frame near the rear thereof, and
(k) an elevating means interconnecting the outer frame and vibratory frame for elevating the earth working implements above the ground.

13. The invention as defined in claim 12 wherein said means for resiliently supporting is in the form of pneumatic tires.

References Cited
UNITED STATES PATENTS

| | | | |
|---|---|---|---|
| 2,016,006 | 10/1935 | Hall et al. | 174—61 |
| 2,522,308 | 9/1950 | Silva | 172—464 X |
| 2,918,979 | 12/1959 | Graham | 172—482 X |
| 2,949,871 | 8/1960 | Finn | 172—40 X |

ABRAHAM G. STONE, *Primary Examiner.*

J. R. OAKS, *Assistant Examiner.*